June 12, 1956
S. J. CZARNIK
2,749,961
MACHINE FOR MAKING LABYRINTH SEALS
Filed June 7, 1952
4 Sheets-Sheet 2
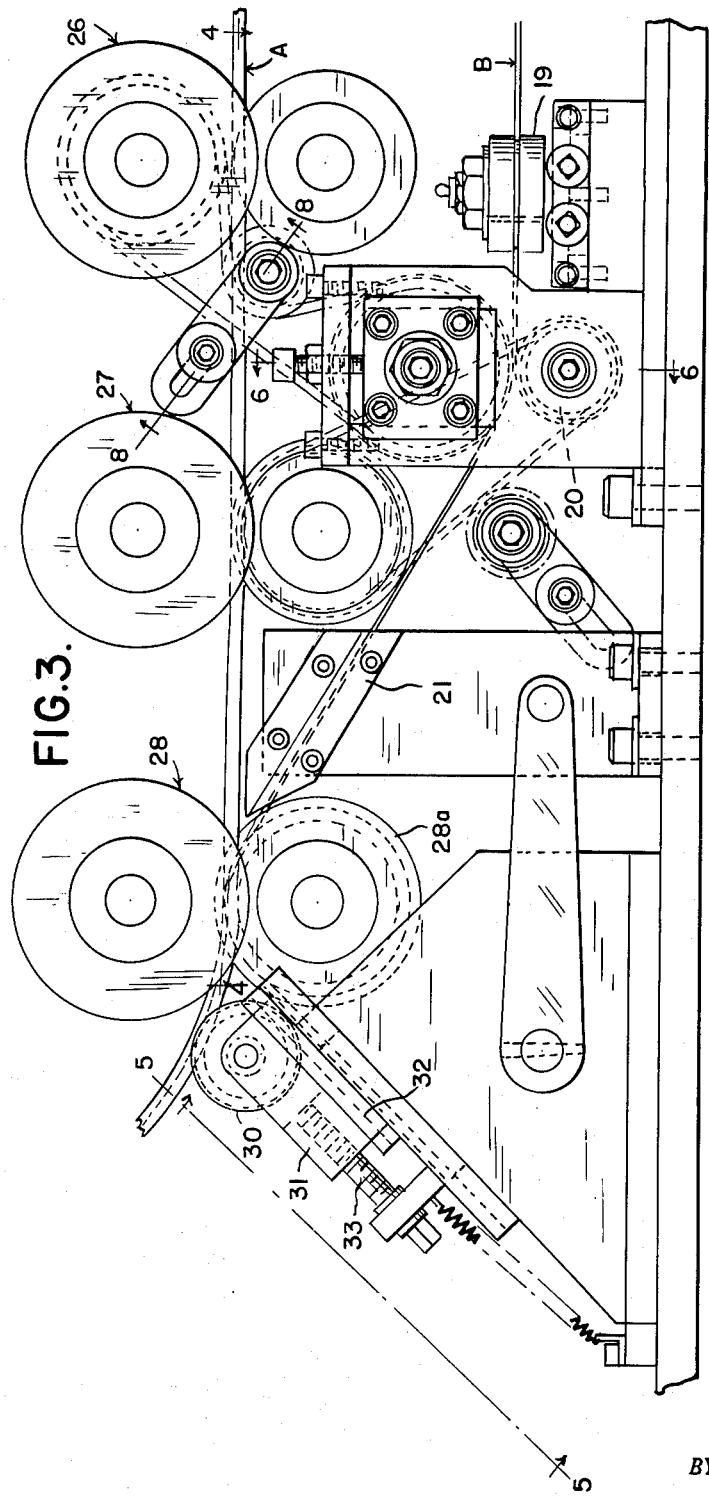
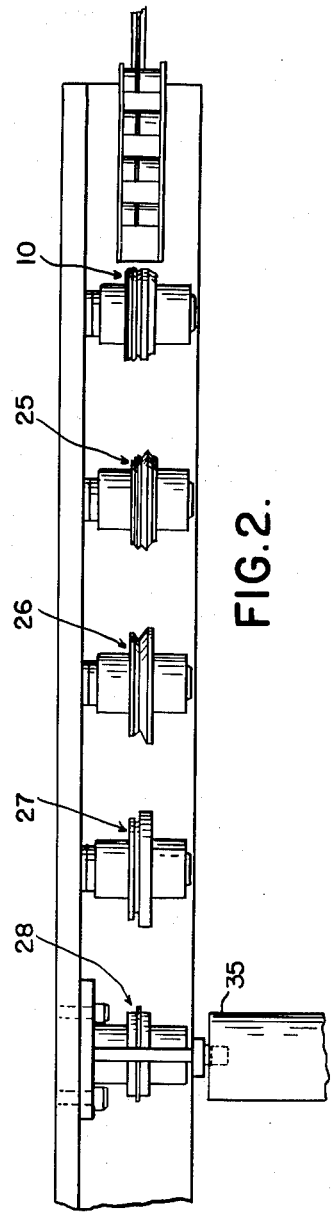
INVENTOR.
STANLEY J. CZARNIK
BY Hauke & Hardesty
ATTORNEYS June 12, 1956  S. J. CZARNIK  2,749,961
MACHINE FOR MAKING LABYRINTH SEALS
Filed June 7, 1952  4 Sheets-Sheet 3
FIG.4.
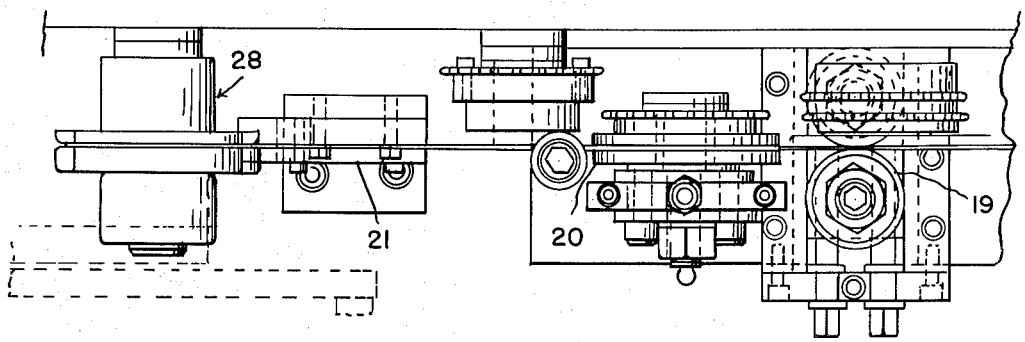
FIG.8.  FIG.7.  FIG.6.
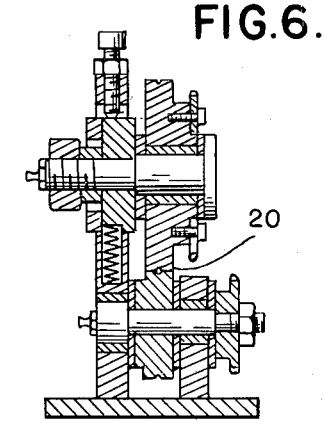
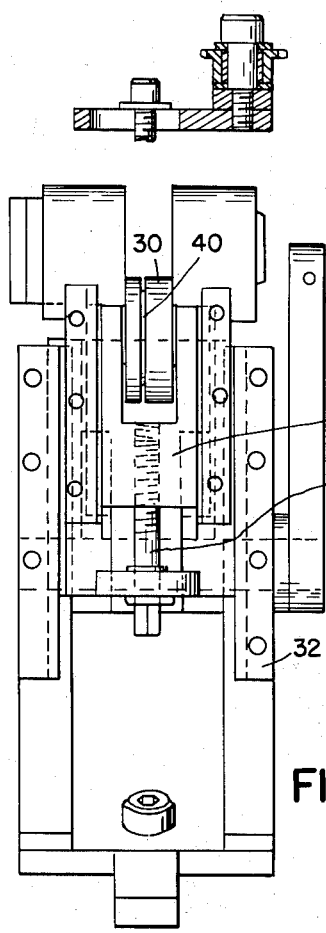
FIG.17.
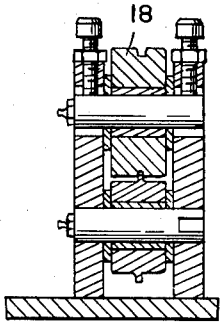
FIG.5.
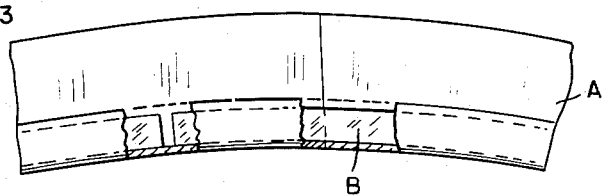
INVENTOR.
STANLEY J. CZARNIK
BY Hauke & Haverty
ATTORNEYS June 12, 1956 S. J. CZARNIK 2,749,961
MACHINE FOR MAKING LABYRINTH SEALS
Filed June 7, 1952 4 Sheets-Sheet 4
FIG.9. FIG.10.
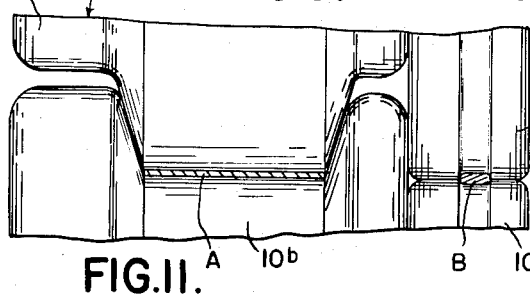
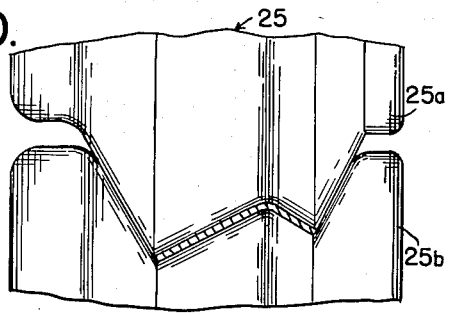
FIG.11. FIG.12.
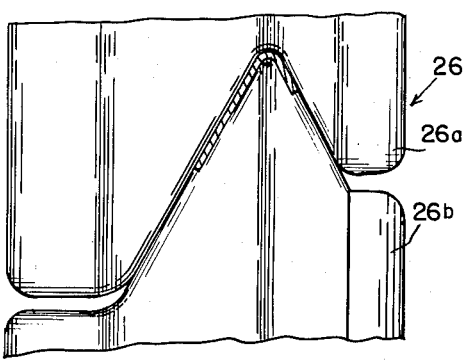
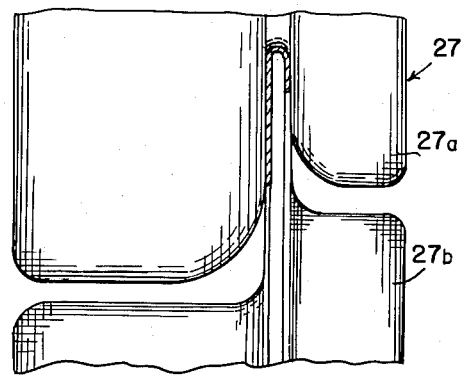
FIG.13. FIG.14.
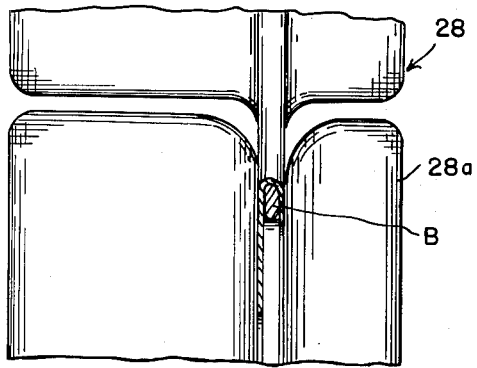
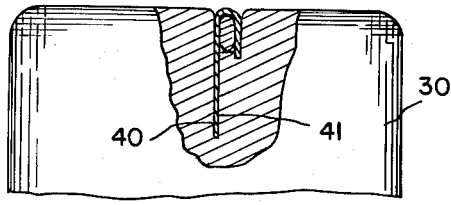
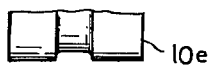
FIG.15.
FIG.16.
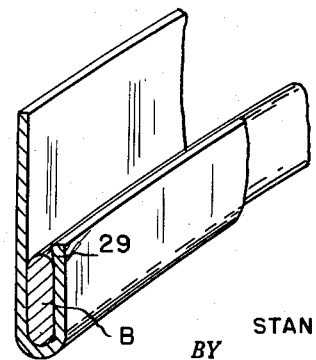
INVENTOR.
STANLEY J. CZARNIK
BY
ATTORNEYS United States Patent Office 2,749,961
Patented June 12, 1956

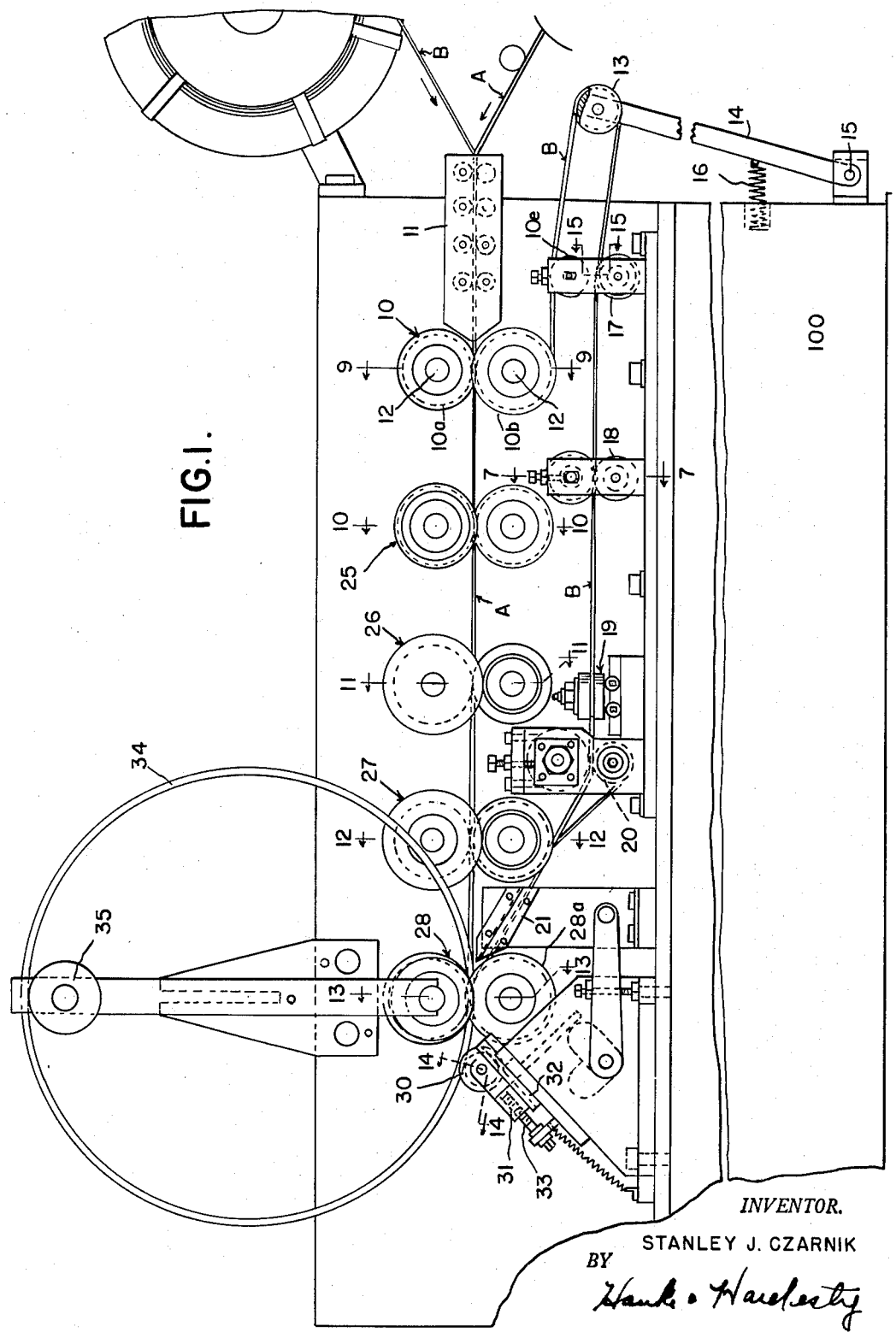

2,749,961

MACHINE FOR MAKING LABYRINTH SEALS

Stanley J. Czarnik, Lincoln Park, Mich., assignor, by mesne assignments, to Abdite Industries, Inc., Taylor Center, Mich., a corporation of Michigan Application June 7, 1952, Serial No. 292,352

8 Claims. (Cl. 153—1)

This invention relates to a machine for forming circular labyrinth seal structures comprising a radially outwardly opened J-section channel member and a flattened wire in the channel portion of said channel section, and more particularly to a combination of several instrumentalities cooperating to produce a circular coiled element suitable to be subsequently severed or cut to form said circular or ring like labyrinth seal structures.

These seal structures are customarily made of separate elements and manually assembled just prior to assembly with an engine, these seals being particularly constructed for assembly with turbo-jet engines. They are particularly fragile and as customarily shipped, they become all tangled up and many are bent or so distorted that they are more or less useless and thus are scrapped.

It is an object of the present invention to overcome the aforesaid difficulties by making these seal rings as an assembly of the channel and wire, these assemblies being able to withstand packing and shipment, thus resulting in a minimum of scrap, and economies in manufacturing as the present assembly is particularly adaptable to facilitate assembly of seals with the engine.

Further objects of the present invention are to provide improved seal structures, to minimize manufacturing costs and scrap, and to void the necessity of manually assembling these parts, by providing a novel machine for forming and assembling this multi-piece seal structure, and providing for ease of adjustment to make seal structures of various diameters.

For a more detailed understanding of the invention reference may be had to the accompanying drawings illustrating a preferred embodiment of the invention in which the like parts are referred to by like characters throughout the several views, and in which:

Fig. 1 is a side elevational view of the machine.

Fig. 2 is a fragmentary plan view thereof.

Fig. 3 is an enlarged fragmentary side view of a part of the machine showing the final assembly roll mechanism and the coiling mechanism.

Fig. 4 is a plan sectional view taken on the line 4—4 of Fig. 3.

Fig. 5 is a plan view of coiling roll showing the adjustable support for same and taken substantially on the line 5—5 of Fig. 3.

Fig. 6 is a detail transverse sectional view taken on the line 6—6 of Fig. 3.

Fig. 7 is a transverse sectional view taken on the line 7—7 of Fig. 1.

Fig. 8 is a detail sectional view taken on the line 8—8 of Fig. 3.

Figs. 9, 10, 11, 12 and 13 are enlarged fragmentary views of forming rolls, as taken respectively on the lines 9—9, 10—10, 11—11, 12—12 and 13—13 of Fig. 1.

Fig. 14 is a detail of the coiling roll taken on the line 14—14 of Fig. 1.

Fig. 15 is a fragmentary sectional view of a wire guiding roll taken on the line 15—15 of Fig. 1.

Fig. 16 is a detail perspective view of an assembled channel and wire assembly, and Fig. 17 is a fragmentary detail, partly in section of a labyrinth seal ring structure.

The preferred form of construction is illustrated in the accompanying drawings and comprises a machine having a plurality of forming rolls acting on a continuous strip metal ribbon and a continuous wire both of which, respectively identified by reference characters "A" and "B," are fed to the initial or first forming roll means 10. Both said wire B and strip stock A are first led through a guide 11 in advance of the forming roll 10. The metal strip is smoothed and flattened between rolls 10a and 10b (see Fig. 9) and these rollers are mounted on suitable shafts 12, at least one of said shafts being power driven in any suitable manner. Rollers 10c and 10d are also mounted and suitably keyed to shafts 12 and are constructed to flatten the wire "B" as shown. Said rolls 10a, 10b, 10c and 10d may be separate if so desired, but inasmuch as 10a and 10c rotate together and are mounted on the same shaft as are rolls 10b and 10d, those rollers may be said to comprise compound rolls.

The flattened wire which is extended somewhat in this flattening step is wound around the roll 10d and conducted over the guide roller 10e, then about a take up roll 13, said take up roll being carried or supported on an arm 14 pivotally mounted as at 15 to the machine frame 100, a tension spring 16 urging said arm 14 pivotally mounted as at 15 to the machine frame 100, a tension spring 16 urging said arm 14 away from the initial or first forming roll means 10. The wire is led from roll 13 through suitable guide rolls 17 and 18 forwardly of the machine, is then turned about its longitudinal axis about 90 degrees and guided through the guide rolls 19 and 20 and thence into guide 21 to the final forming roll where it is rolled into the channel formed into the strip stock as will be later described.

The continuous flat strip stock is conducted from the initial forming roll means 10 to the forming rolls 25, 26 and 27, these rolls as shown in Figs. 10, 11 and 12 comprising respectively upper and lower forming rolls 25a and 25b, 26a and 26b, and 27a and 27b. The strip stock is first longitudinally crimped as in Fig. 10, then more deeply creased as in Fig. 11 and then finally formed into an inverted J-section, as illustrated in Fig. 12. The inverted J-section channel is fed from forming rolls 27 to the final assembly forming roll mechanism 28, and the flattened wire is guided by the guide 21 into the channel of this J-section (see Fig. 13). The side faces of the groove roll 28a are designed to exert a side pressure to tightly squeeze the flattened wire between the side walls of the channel. This side pressure tends to slightly distort the edge of the short side of said channel a very little distance over the wire B as at 29 (see Fig. 16). This very slight overlap and tight clinching of the channel onto the wire serves to readily prevent accidental separation of the wire and channel during shipment and while said assembly is being coiled and severed into individual circular seal rings.

The assembled channel member and flattened wire are rolled through the final assembly and fed forwardly to engage the coiling roll 30. As will be seen (refer to Figs. 1, 3 and 5) this coiling roll is disposed relative to the final assembly rolls to produce a curve in the channel and wire assembly, the adjustment of this coiling roll closer to or away from the final assembly rolls 28 respectively resulting in making a shorter or longer radius to the curve of the channel and wire assembly. This coiling roll is carried by the support 31 slidably supported in gibs 32 and adjustably positioned by the adjusting screw 33. The coiled assembly 34 is engaged over the support 35 and as the machine is operated, the coil is spirally wound on the said support and said coil is adapted to be severed in suitable lengths to complete a circular seal ring of a predetermined diameter. When severed, the ring may be shipped without the wire becoming disengaged from the channel.

However, to fit the sealing ring to an engine, the wire can be readily disengaged from the channel with a suitable tool and the wire slipped around so that the break in the wire will not register with the break in the channel.

It will be observed that the long side flange 40 of J-section channel is guided in the deep groove 41 of the coil roller 30, this roller 30 being so adjustably positioned to give the proper curvature to the channel and wire assembly and also gives a slight lead to the spiral of said coiled assembly.

The take-up assembly associated with the wire feed provides means permitting the feed of the wire to the final assembly roll at the same speed as said J-section channel is fed to said final assembly roll.

While only one preferred construction is herein shown and described, it will be readily apparent to those skilled in the art to which this invention pertains that various modifications in a construction may be made herein without departing from the spirit of the invention or from the scope of the appended claims.

I claim:

1. A machine for making a labyrinth seal element comprising means for feeding strip metal stock and a continuous wire to said machine, a first station comprising driven rolls constructed to flatten both said strip stock and said wire, a plurality of secondary forming rolls to shape said flat strip into an inverted J section, means guiding said flattened wire comprising rolls and a guide block, a final set of forming rolls receiving said inverted J section and said flattened wire, said guide block operable to guide said flattened wire into said J section and through said final set of forming rolls where said flattened wire is tightly secured in the groove of said J section, and means acting on said assemled wire and J section to spirally form said assembly into a coil with open groove of said J section facing radially outwardly, said coil assembly being subsequently cut into predetermined lengths to form a circular labyrinth seal element.

2. In a machine for forming and assembling a labyrinth seal element, a plurality of sets of rolls for forming a J section channel out of flat strip stock, a driven assembly roll receiving said J section channel, one of said sets of rolls comprising a compound roller provided with means for flattening a wire fed therethrough, and a spring supported take up drum for said flattened wire from which said flattened wire may be fed to said driven assembly roll at the same speed as said J section channel is fed therethrough.

3. In a machine for forming and assembling a labyrinth seal element, a plurality of sets of rolls for forming a J-section channel out of flat strip stock, a driven assembly roll receiving said J-section channel, one of said sets of rolls comprising a compound roller provided with means for flattening a wire fed therethrough, and a spring supported take up drum for said flattened wire from which said flattened wire may be fed to said driven assembly roll at the same speed as said J-section channel is fed thereto, and a guide for said flattened wire constructed to rotate same about its longitudinal axis and to guide the wire to said assembly roll acting on said channel and wire assembly to secure the wire in said channel, and means acting on the assembled channel and wire as same leaves the driven assembly roll to spirally wind said assembly into a coil.

4. In a machine for forming and assembling a labyrinth seal element comprising a final assembly roll mechanism, means for driving said roll mechanism, means for forming a channel section and conducting same to said final assembly roll mechanism, said channel forming means comprising a plurality of forming roll mechanisms, means for feeding strip stock to said channel forming means, the first of said forming roll mechanisms receiving said strip stock, means for feeding a wire to said first roll mechanism, said first roll mechanism comprising a compound roller having axially spaced means respectively acting on said strip stock and making the first forming operation and on said wire to flatten same, and a yieldingly mounted take-up means cooperating with the moving wire after it leaves the said first roll mechanism, whereby to take up such slack as may arise so that both said formed channel strip and said flattened wire are fed to the final assembly roll mechanism at the same speed.

5. In a machine for forming and assembling a circular coiled labyrinth seal element, consisting of a substantially J-section channel section having a flattened wire in said channel portion of said section, and substantially filling same, means guiding said flattened wire to align same with the J-section channel and to feed said wire thereto, a final roll mechanism comprising a pair of complementary tongued and grooved rolls through which is threaded said wire and J-section channel assembly, the side walls of said grooved wall being so dimensioned for exerting a force against the sides of said wire and J-section channel assembly for tightly squeezing said flattened wire in said channel portion, and means acting on said channel and wire assembly to form same into a continuous coil with the open groove of said J-section facing radially outwardly, the squeezing of said wire in said channel serving to retain the wire in place in said assembly during subsequent forming and severing operations for the making of individual circular labyrinth seals and during shipment of same.

6. In a machine for forming and assemblying a continuous coiled labyrinth seal element prior to severing operations for the making of individual circular labyrinth seal elements, said seal structure comprising a J-section channel member opening radially outwardly and a flattened wire fitted into the channel portion of said member, means guiding said flattened wire to align same with the said J-section channel and feeding said wire thereto, a final assembly roll mechanism having tongued roller and a grooved roller, said tongue roller bearing on the top of said wire and J-section channel assembly and the grooved roller being dimensioned and constructed to laterally apply pressure to said channel for squeezing said channel portion on said flattened wire for finally assembling said wire and channel, and a grooved bending roll bearing on the channel and wire assembly as same leaves the final assembly roll mechanism to impart a curvature to said continuous channel and wire assembly to form a circular coil structure.

7. In a machine for forming and assembling a labyrinth seal element prior to severing operations for the making of individual circular labyrinth seal elements, said seal structure comprising a J-section channel member and a flattened wire fitted into the channel portion of said member, a final assembly roll mechanism having a grooved roller constructed to apply pressure squeezing said channel portion on said flattened wire for finally assembling said wire and channel, and a grooved bending roll bearing on the channel and wire assembly as same leaves the final assembly roll mechanism to impart a curvature to said continuous channel and wire assembly to form a circular coil structure, said bending roll having a groove of a width to receive the channel portion and an extended groove constructed to receive the long extended portion of said J-section, the open part of said J-section member facing the grooved bending roll, whereby to form a circular labyrinth seal with its open groove facing radially outwardly, said squeezing of said side channel portions on said flattened wire resulting in a slight overlapping of the side walls of the channel with respect to the flattened wire, said greater sectional dimension of said flattened wire being slightly less than the depth of the channel of said J-section member.

8. In a machine for forming and assembling a coiled labyrinth seal prior to severing operatings for the making of individual labyrinth seal elements, said seal structure comprising a J-section channel member and a flattened wire fitted into the channel portion of said member, a final assembly roll mechanism having a grooved roller constructed to apply pressure squeezing said channel portion on said flattened wire for finally assembling said wire and channel, and a grooved bending roll bearing on the channel and wire assembly as same leaves the final assembly roll mechanism to impart a curvature to said continuous channel and wire assembly to form a circular coil structure, said bending roll having a groove of a width to receive the channel portion and an extended groove constructed to receive the long extended portion of said J-section member, the open part of said J-section member facing the grooved bending roll, whereby to form a circular labyrinth seal with its open groove facing radially outwardly, said squeezing of said side channel portions on said flattened wire resulting in a slight overlapping of the side walls of the channel with respect to the flattened wire, said greater sectional dimension of said flattened wire being slightly less than the depth of the channel of said J-section member, and means adjustably supporting said bending roll whereby to permit same to be adjusted at varying distances relative to the final assembly roll, to vary the diameter of the coiled seal structure.

References Cited in the file of this patent

UNITED STATES PATENTS

| | | |
|---|---|---|
| 976,353 | Gansslen | Nov. 22, 1910 |
| 995,604 | Keagy | June 20, 1911 |
| 1,262,944 | Haldeman | Apr. 16, 1918 |
| 1,490,772 | Gunn | Apr. 15, 1924 |
| 1,771,955 | Fork et al. | July 29, 1930 |
| 1,832,524 | Bosley | Nov. 17, 1931 |
| 2,056,675 | Kellogg | Oct. 6, 1936 |
| 2,190,429 | Kellogg | Feb. 13, 1940 |
| 2,416,865 | Bronander | Mar. 4, 1947 |
| 2,440,792 | Wyllie | May 4, 1948 |

FOREIGN PATENTS

| | | |
|---|---|---|
| 22,709 | Great Britain | Oct. 2, 1911 |